United States Patent [19]

Adam

[11] 4,244,691
[45] Jan. 13, 1981

[54] NOVEL WATER-SOLUBLE ANTHRAQUINONE DYES

[75] Inventor: Jean-Marie Adam, Saint-Louis, France

[73] Assignee: Ciba-Geigy Corporation, Ardsley, N.Y.

[21] Appl. No.: 94,852

[22] Filed: Nov. 16, 1979

[30] Foreign Application Priority Data

Nov. 24, 1978 [CH] Switzerland ............. 12068/78

[51] Int. Cl.³ ............. C07C 143/665; C09B 1/52; C09B 5/62
[52] U.S. Cl. ............. 8/676; 8/643; 260/370; 260/371; 260/372; 260/373; 260/375; 260/380
[58] Field of Search ............. 8/39 B, 25; 260/373, 260/375, 380, 371, 372

[56] References Cited

U.S. PATENT DOCUMENTS

| | | | |
|---|---|---|---|
| 2,870,173 | 1/1959 | Hinderman et al. | 260/373 |
| 3,467,681 | 9/1969 | Hederich et al. | 260/373 |
| 3,549,665 | 12/1970 | Buehler et al. | 260/372 |
| 3,929,842 | 12/1975 | Yamada et al. | 260/380 |
| 4,036,862 | 7/1977 | Hederich et al. | 260/380 |
| 4,101,547 | 7/1978 | Mislin et al. | 260/372 |
| 4,138,414 | 2/1979 | Baumann | 260/372 |

FOREIGN PATENT DOCUMENTS

2022123 12/1979 United Kingdom.

*Primary Examiner*—A. Lionel Clingman
*Attorney, Agent, or Firm*—Prabodh I. Almaula; Edward McC. Roberts

[57] ABSTRACT

The invention relates to novel, water-soluble anthraquinone dyes which, in the form of the free acid, have the formula I

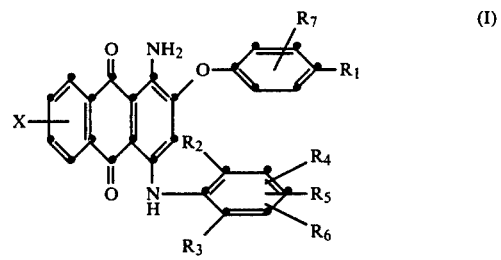

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_6$ and $R_7$ independently of one another are hydrogen, an unbranched or branched alkyl radical having 1-4 carbon atoms, a —$SO_3H$ group, halogen or a radical of the formula —$CH_2$—NH—CO—Y, in which Y is an alkyl or alkenyl radical having 1 to 4 carbon atoms which is unsubstituted or substituted by one or two halogen atoms, or is a substituted or unsubstituted phenyl radical, with the proviso that at least one of the radicals $R_6$ or $R_7$ is a —$SO_3H$ group.

26 Claims, No Drawings

NOVEL WATER-SOLUBLE ANTHRAQUINONE DYES

The invention relates to novel water-soluble anthraquinone dyes, processes for the preparation of these dyes, novel intermediates which are formed during the preparation, the use of the dyes for dyeing or printing textile material, in particular natural and synthetic polyamide materials, and also the textile material dyed and printed using these novel anthraquinone dyes.

Violet dyes with good affinity for natural and synthetic polyamide material are desired. Violet milling dyes of the anthraquinone series have indeed been disclosed in German Patent Specification No. 821,384, but these dyes possess a poor affinity for polyamide materials.

Novel, violet, water-soluble anthraquinone dyes have now been found which are distinguished by good uptake and very good wet fastness properties.

The invention thus relates to novel, water-soluble anthraquinone dyes, and mixtures thereof with one another, which, in the form of the acid, have the formula I

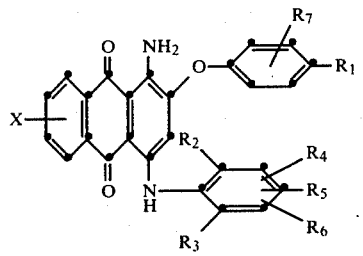

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_6$ and $R_7$ independently of one another are hydrogen, an unbranched or branched alkyl radical having 1–4 carbon atoms, a —$SO_3H$ group, halogen or a radical of the formula —$CH_2NH$—CO—Y, in which Y is an alkyl or alkenyl radical having 1 to 4 carbon atoms which is unsubstituted or substituted by one or two halogen atoms, or is a substituted or unsubstituted phenyl radical, with the proviso that at least one of the radicals $R_6$ or $R_7$ is a —$SO_3H$ group.

X is a halogen atom, for example a fluorine or bromine atom and preferably a chlorine atom, which is in the 6-position or 7-position of the 1,4-diaminoanthraquinone.

As an unbranched or branched alkyl radical having 4 to 8 carbon atoms, $R_1$ is, for example, one of the following radicals: the n-, sec.- or tert.-butyl radical or a n-, sec.- or tert.-pentyl, hexyl or octyl radical; in preferred anthraquinone compounds $R_1$ is a branched alkyl radical having 4 to 8 carbon atoms, in particular the tert.-butyl radical.

As an unbranched or branched alkyl radical having 1 to 4 carbon atoms, $R_2$, $R_3$, $R_4$ and $R_5$ are, for example, the methyl, ethyl, n- or iso-propyl or n-, sec.- or tert.-butyl radical. In preferred anthraquinone compounds, $R_2$ and $R_3$ are each a methyl radical and $R_5$ is an unbranched alkyl radical having 1 to 2 carbon atoms.

An amino group $R_4$ can be monosubstituted on the N atom; this group is, for example, an alkylamino radical, such as the methylamino or ethylamino radical.

If $R_4$ is an acylated amino group, these radicals $R_4$ have, in particular, the formula —NHCO-Q or —NH-$SO_2$-Q, in which Q is an alkyl radical, in particular the methyl radical, or an aryl radical, in particular the phenyl radical.

If $R_4$ is an amino group to which a fibre-reactive radical is also bonded, these radicals $R_4$ have the formula —NHZ, in which Z is a fibre-reactive radical.

A fibre-reactive radical Z is understood as meaning a radical which contains one or more reactive groups or detachable substituents, which, when the dyes are applied to, for example, high molecular weight polyamide fibres or wool, are able to react with the NH groups of these fibres, with the formation of covalent bonds. A large number of fibre-reactive groupings of this type are known from the literature.

Examples of suitable fibre-reactive groups Z are those of the aliphatic series, such as the acryloyl, vinylsulfonyl, β-sulfatoethylaminosulfonyl, mono-, di- or tri-chloro- or mono-, di- or tri-bromo-acryloyl, such as —CO—CH=CH—Cl,    —CO—CCl=CH$_2$, —CO—CH=CHBr,    —CO—CBr=CH$_2$, —CO—CBr=CHBr and —CO—CCl=CH—CH$_3$, and also —CO—CCl=CH—COOH,    —CO—CH=C-Cl—COOH, β-chloropropionyl, 3-phenylsulfonylpropionyl, 3-methylsulfonylpropionyl, β-chloroethylsulfonyl, β-sulfatoethylsulfonyl, β-methylsulfonyl-ethylsulfonyl, βphenylsulfonylethylsulfonyl, 2-fluoro-2-chloro-3,3-difluorocyclobutane-1-carbonyl,    2,2,3,3-tetrafluorocyclobutane-1-carbonyl or -1-sulfonyl, β-(2,2,3,3-tetrafluorocyclobutyl-1)-acryloyl or α- or β-alkyl- or -aryl-sulfonyl-acryloyl group, such as α- or β-methylsulfonylacryloyl.

Suitable reactive radicals, especially for polyamide and in particular for wool, are: chloroacetyl, bromoacetyl, α,β-dichloro- or α,β-dibromo-propionyl, α-chloro- or α-bromo-acryloyl, 2,4,6-trifluoro-pyrimid-5-yl and 2,4,6-trifluorotriazinyl radicals and also fluorotriazinyl radicals of the formula

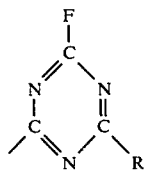

in which R is a substituted or unsubstituted amino group or a free or etherified oxy or thio group, for example the $NH_2$ group, an amino group monosubstituted or disubstituted by $C_1$-$C_4$-alkyl radicals, a $C_1$-$C_4$-alkoxy group, a $C_1$-$C_4$-alkylmercapto group, arylamino, especially phenylamino, or phenylamino substituted by methyl, methoxy, chlorine and in particular sulfo, or phenoxy or mono- or di-sulfophenoxy, and also dichlorotriazinylamino radicals and their derivatives containing sulfo groups, for example

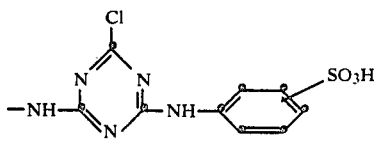

and

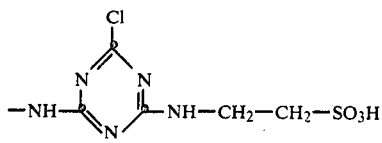

Examples of such triazine compounds are: 2,4-difluoro-6-aminotriazine, 2,4-difluoro-6-methylaminotriazine, 2,4-difluoro-6-ethylaminotriazine, 2,4-difluoro-6-phenylaminotriazine, 2,4-difluoro-6-(2'-, 3'- or 4'-sulfophenyl)-aminotriazine, 2,4-difluoro-6-(2',4'- or 3',4'- or 2',5'- or 4',5'-disulfophenyl)-aminotriazine, 2,4-difluoro-6-dimethylaminotriazine, 2,4-difluoro-6-methoxytriazine, 2,4-difluoro-6-(β-methoxyethoxy)-triazine, 2,4-difluoro-6-methylmercaptotriazine and 2,4-difluoro-6-phenylmercapto-triazine.

Particularly preferred reactive radicals Z are, in particular, the α-bromoacryloyl group and the α,β-dibromopropionyl group. The former either can be introduced with the aid of bromoacryloyl chloride or can be obtained from the α,β-dibromopropionyl group by detaching hydrogen bromide. The above also applies analogously in the case of the α-chloroacryloyl group. The 4,6-difluorotriazin-2-yl or the 4-fluoro-6-alkyl- or -arylaminotriazine-2-yl groups are also of interest.

In preferred anthraquinone dyes of the formula I, $R_4$ is hydrogen.

As an alkyl radical having 1 to 4 carbon atoms, $R_6$ or $R_7$ can be a methyl, ethyl, n- or iso-propyl or n-, sec.- or tert.-butyl radical. Halogen $R_6$ or $R_7$ can be fluorine, bromine or, in particular, chlorine. If $R_6$ or $R_7$ is a radical of the formula $-CH_2NH-CO-Y$, Y is one of the abovementioned alkyl radicals having 1 to 4 carbon atoms or is an alkenyl radical, preferably $-CH=CH_2$, or is a phenyl radical, which can be substituted by the said halogens or by an alkyl radical having 1 to 4 carbon atoms.

At least one of the radicals $R_6$ and $R_7$ is a $SO_3H$ group. Preferably, one of these radicals is a $SO_3H$ group and the other is hydrogen.

Anthraquinone dyes of particular interest are those of the formula I in which $R_1$ is a tert.-butyl radical, $R_2$, $R_3$ and $R_5$ are each a methyl group and $R_5$ is in the p-position relative to the amino group, X is a chlorine atom and one of the groups $R_6$ and $R_7$ is hydrogen and the other is a $SO_3H$ radical.

The novel water-soluble anthraquinone dyes of the formula I are violet dyes which are characterised, in particular, by a good affinity for a build-up on polyamide materials, by clear shades and also by good wet fastness properties, such as fastness to hot water, fastness to perspiration and fastness to washing.

Various routes are available for the preparation of the novel anthraquinone dyes according to the invention.

The compounds which, in the form of the free acid, have the formula II

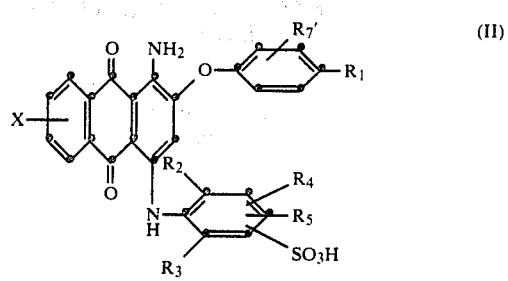

in which X, $R_1$, $R_2$, $R_3$, $R_4$ and $R_5$ are as defined above and $R_7'$ is hydrogen, an unbranched or branched alkyl radical having 1 to 4 carbon atoms, halogen or a radical of the formula $-CH_2-NH-CO-Y$, in which Y is an alkyl radical or alkenyl radical having 1 to 4 carbon atoms, which is unsubstituted or substituted by one or two halogen atoms, or is a substituted or unsubstituted phenyl radical, are obtained by selectively monosulfonating an anthraquinone compound of the formula V

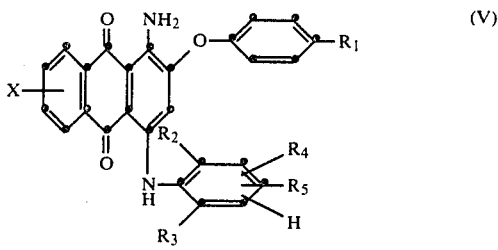

in which X, $R_1$, $R_2$, $R_3$, $R_4$ and $R_5$ are as defined above, and, if desired, subsequently halogenating the reaction product in the phenol ring or reacting it with a compound of the formula $HOCH_2-NH-CO-Y$, in which Y is as defined above.

This selective monosulfonation is effected, for example, by reacting an anthraquinone compound of the formula V with oleum, which contains 1 to 65 percent by weight, in particular 20 to 30 percent by weight and especially 25 percent by weight of free sulfur trioxide, at a temperature of 0° to 5° C. and in particular 0° to 2° C., the concentration of free $SO_3$ in the reaction mixture being 4–6%.

Another possibility for the selective monosulfonation of an anthraquinone compound of the formula V comprises reacting this compound with an equivalent amount of chlorosulfonic acid in a halogenated hydrocarbon at a temperature of 50° to 80° C.

Suitable halogenated hydrocarbons are aromatic hydrocarbons, such as monochlorobenzene or dichlorobenzene, and also, in particular, aliphatic hydrocarbons, such as trichloroethylene and in particular carbon tetrachloride.

A further possibility for the preparation of the anthraquinone dyes of the formula II comprises reacting an anthraquinone compound of the formula VI

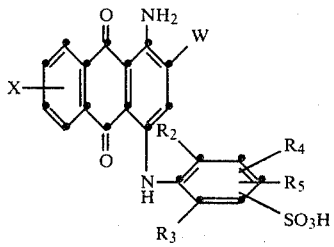 (VI)

in which X, $R_2$, $R_3$, $R_4$ and $R_5$ are as defined above and W is halogen or a —$SO_3H$ group, with a p-alkylphenol of the formula VII

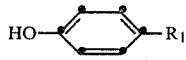 (VII)

in which $R_1$ is as defined above, in the presence of acid-binding agents and at elevated temperature.

The reaction of the anthraquinone compound of the formula VI with the P-alkylphenol of the formula VII is preferably carried out at a temperature of 180° to 240° C. and in particular at 220° C., this reaction preferably being carried out with a melt of the phenol of the formula VII. Surprisingly, in this reaction the phenol of the formula VII reacts selectively with the group W of the anthraquinone compound of the formula VI and not with the halogen X or the $SO_3H$ group in the phenyl-amino radical.

Suitable acid-binding agents are, for example, the hydroxides of the alkali metals, preferably of potassium and sodium, such as potassium hydroxide or sodium hydroxide.

The novel water-soluble anthraquinone dyes which, in the form of the free acid, have the formula III

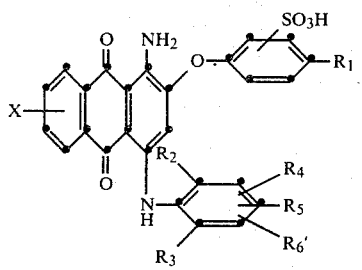 (III)

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_6'$ is hydrogen, an unbranched or branched alkyl radical having 1 to 4 carbon atoms, halogen or a radical of the formula —$CH_2$—NH—CO—Y, in which Y is an alkyl or alkenyl radical having 1-4 carbon atoms, which is unsubstituted or substituted by one or two halogen atoms, or is a substituted or unsubstituted phenyl radical, are obtained by effecting selective desulfonation in the aniline ring of an anthraquinone compound of the formula IV

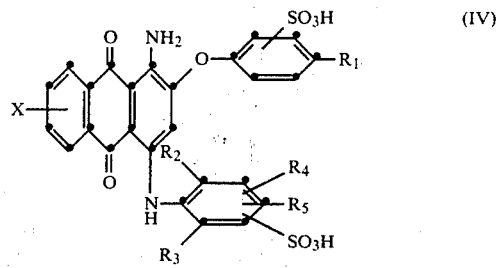 (IV)

in which X, $R_1$, $R_2$, $R_3$, $R_4$ and $R_5$ are as defined above, and, if desired, subsequently replacing a hydrogen atom in the aniline ring of the resulting product by halogen or a group of the formula —$CH_2$—NH—CO—Y, in which Y is as defined above.

The selective desulfonation is effected, for example, with 60 to 90%, preferably 80%, aqueous sulfuric acid at a temperatue of 80 to 120° C. and in particular 110° C., or by means of sulfolane (=tetramethylenesulfone) at a temperature of 180° to 220° C. and in particular 210° C., the reaction time in both cases being about 30 to 70 minutes.

The compounds of the formula IV, which likewise are novel water-soluble anthraquinone dyes, are obtained by sulfonating an anthraquinone compound of the formula V given above, so that two sulfonic acid groups are introduced. Preferably, the sulfonation is effected at a temperature of 15° to 40° C., and in particular at about °° C., with oleum containing 1–20 and preferably 5–10% of free sulfur trioxide.

If the radical $R_4$ in the anthraquinone dyes of the formulae II, III or IV is an acylated amino group or a fibre-reactive radical —NHZ, it is advantageous to use starting compounds of the formula VI or V in which $R_4$ is an acylatable amino group and to react these compounds with the phenol of the formula VII or, respectively, to sulfonate them. The resulting reaction products can then subsequently be reacted with a compound which introduces the acyl radical or the fibre-reactive radical Z, to give an actylated or fibre-reactive dye. Acyl compounds suitable for this purpose are, for example, those on which the said reactive groups are based, in general halides, and in particular chlorides, of the said components, and the condensation reaction is generally carried out in an aqueous or organic medium and in an alkaline to acid range.

As explained above, the intermediates of the formula V are used to prepare not only the anthraquinone dyes, according to the invention, of the formula II but also those dyes of the formula IV. These intermediates of the formula V are novel and are obtained, for example, by reacting a compound of the formula

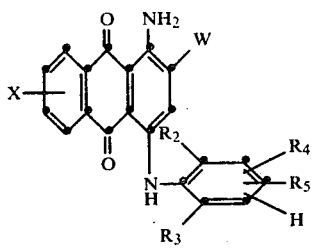

in which X, $R_2$, $R_3$, $R_4$ and $R_5$ are as defined above and W is halogen or a $SO_3H$ group, with a p-alkylphenol of the formula VII

in which $R_1$ is as defined above. The reaction is carried out under the conditions indicated for the preparation of the compounds of the formula VI.

The compounds of the formula VIII in which X, $R_2$, $R_3$, $R_4$ and $R_5$ are as defined above and W is a $SO_3H$ group are described in Swiss Patent Application No. 6075/78-0. Those compounds of the formula IX

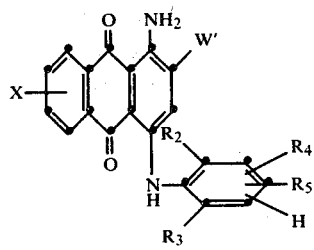

in which X, $R_2$, $R_3$, $R_4$ and $R_5$ are as defined above and W' is halogen, are novel. The compounds of the formula VIII or IX are obtained by reacting an anthraquinone compound of the formula X

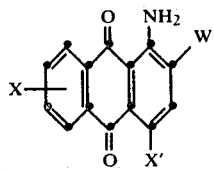

in which X and W are as defined above and X' is halogen or a $SO_3H$ group, with a phenylamine of the formula XI

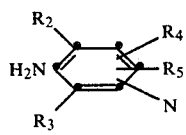

in which $R_2$, $R_3$, $R_4$ and $R_5$ are as defined above.
The intermediates of the formula

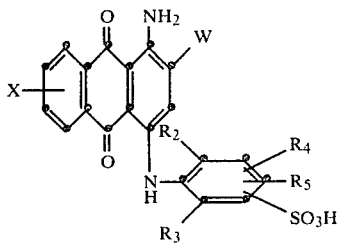

in which X, $R_2$, $R_3$, $R_4$ and $R_5$ are as defined above and W is halogen or a $SO_3H$ group, are novel and are themselves also already suitable as violet dyes for dyeing natural and synthetic polyamide materials.

They are obtained by processes known per se, for example by reacting an anthraquinone compound of the formula X given above with a phenylamine of the formula XII

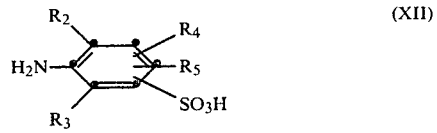

in which $R_2$, $R_3$, $R_4$ and $R_5$ are as defined above.

The anthraquinone compounds of the formula X and the phenylamines of the formulae XI and XII are known.

Suitable anthraquinone compounds of the formula X are, for example: 1-amino-4-bromo-6-chloro-anthraquinone-2-sulfonic acid, 1-amino-4-bromo-7-chloro-anthraquinone-2-sulfonic acid and a (1:1) mixture of these two compounds or the corresponding compounds which carry halogen in the 2-position, in place of the sulfonic acid group.

Suitable phenylamines of the formulae XI or XII are, for example: 2,4,6-trimethylaniline, 2-methyl-6-ethylaniline, 2,6-dimethyl-aniline and the monosulfonic acids of these three compounds and 5-amino-2,4,6-trimethyl-aniline-3-sulfonic acid.

The anthraquinone compounds of the formula X can be prepared by various methods. They are obtained, for example, by amination of a 1,6- and/or 1,7-dihalogenoanthraquinone in accordance with the procedure of German Patent Specification No. 2,604,830 and subsequent sulfonation in the 2-position, for example with clorosulfonic acid, and halogenation, in particular bromination, in the 4-position. Another possibility for the preparation comprises subjecting an anthraquinone compound which is monosulfonated in the 6-position and/or 7-position to nitration in the 1-position, then replacing the sulfo group in the 6-position and/or 7-position by halogen, in particular chlorine, reducing the nitro group in the 1-position to an amino group and subjecting this 1-amino-6/7-halogeno-anthraquinone compound, as indicated, to sulfonation in the 2-position and then to halogenation in the 4-position, to give the anthraquinone compound of the formula X.

The introduction of a group of the formula —CH$_2$—NH—CO—Y, in which Y is as defined above, is effected by the Tscherniak-Einhorn method, by reacting the anthraquinone compound with a N-methylolamide which carries the group —COY on the N atom, in an acid medium, preferably concentrated sulfuric acid. Suitable N-methylolamides are, for example, N- methylolbenzamide, N-methylol-2,4-dichlorobenzamide, N-methylol-2-chlorobenzamide and N-methylol-4-chlorobenzamide.

The novel water-soluble anthraquinone dyes are used in particular for dyeing or printing natural and synthetic polyamide materials, such as wool and nylon.

If the dyes are fibre-reactive anthraquinone dyes, these can be used for dyeing or printing cellulose materials or natural and synthetic polyamide materials and for dyeing mixed fabrics, for example made of wool/cellulose.

An advantage of the invention is that compounds which hitherto have been worthless waste products (for example sump products from anthraquinone nitrations) can be used as the starting compounds for the preparation of the anthraquinone compounds according to the invention.

The following examples illustrate the invention, without restricting it thereto. Parts are by weight and temperatures are in degrees centrigrade. The term 6/7-chloroanthraquinone is used to indicate a mixture of a 6-chloro-anthraquinone and a 7-chloro-anthraquinone compound. The anthraquinone compounds can be in the form of the free acids or in the form of an alkali metal salt, for example in the form of the ammonium, sodium, potassium or lithium salt.

EXAMPLE 1

43.9 parts of the sodium salt of a mixture of 1-amino-4-bromo-6-chloro-anthraquinone-2-sulfonic acid and 1-amino-4-bromo-7-chloroanthraquinone-2-sulfonic acid are suspended together with 20 parts of 2,4,6-trimethylaniline (mesidine) and 20 parts of sodium bicarbonate in 250 parts of water and 80 parts of methyl alcohol. This mixture is warmed to 75° and 0.6 part of copper powder is sprinkled in, with good stirring. In order to bring the reaction to completion, the mixture is stirred for 15 hours at 80–85°. The excess mesidine is distilled off with steam. 300 parts of methyl alcohol are added to the residue and the hot alcoholic/aqueous dye solution is separated from the copper catalyst by filtration. The filtrate is acidified with dilute hydrochloric acid and the condensation product of the formula

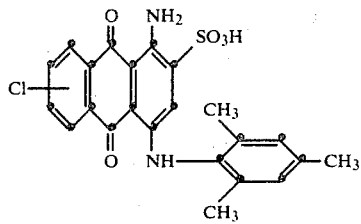

precipitates. This is filteredd off with suction and washed with dilute hydrochloric acid. The material on the suction filter is suspended in 300 parts of water, the pH of the suspension is adjusted to 7.5 with dilute aqueous sodium hydroxide solution, the resulting mixture is warmed to 60° and 300 parts of an aqueous 20% sodium chloride solution are added.

The product is then filtered off and dried.

47.1 parts of this condensation product are dissolved in 300 parts of 10% oleum and the solution is stirred at 30–40° until thin layer chromatography shows no further starting material. The sulfonation mixture is poured into an ice/brine mixture and the sulfonation product which has precipitated is filtered off with suction, washed with brine until neutral and dried. The disulfonic acid thus obtained is now introduced into a molten mixture of 200 parts of p-tertiary butylphenol and 60 parts of a 50% potassium hydroxide solution. Whilst distilling off water, the temperature is raised to 220°. The melt is stirred at this temperature for 4 hours. At 120°, the mixture is diluted with 1,000 parts of a 10% sodium hydroxide solution and the dye is filtered off with suction and washed with warm water. The crude dye is suspended in water, the suspension is rendered acid to Congo red with hydrochloric acid and the p-tertiary butylphenol still adhering to the product is removed by steam distillation. The pH of the suspension is adjusted to 7 with sodium hydroxide solution, the resulting mixture is warmed to 80° and 5% sodium chloride is added. The dye of the formula

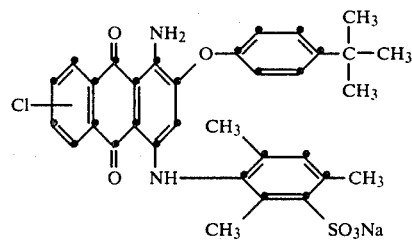

which has precipitated is filtered off with suction and dried. The dye displays an excellent build-up on synthetic polyamide fibres, which it dyes in clear bluish-tinged violet colour shades which are fast to light and fast to wet processing.

Similar violet dyes are also obtained when the 47.1 parts of the condensation product of 1-amino-4-bromo-6/7-chloro-anthraquinone-2-sulfonic acid and 2,4,6-trimethylaniline are replaced by 45.7 parts of the condensation product of 1-amino-4-bromo-6/7-chloro-anthraquinone-2-sulfonic acid and 3,6-dimethylaniline (vicinal xylidine) or by 47.1 parts of the condensation product of 1-amino-4-bromo-6/7-chloro-anthraquinone-2-sulfonic acid and 2-methyl-6-ethylaniline.

EXAMPLE 2

47.1 parts of 1-amino-2-bromo-4-mesidino-6/7-chloro-anthraquinone, obtained by a condensation reaction of 1-amino-2,4-dibromo-6/7-chloroanthraquinone with mesidine, are dissolved in 300 parts of sulfuric acid monohydrate at 25° and 75 parts of 66% oleum are added dropwise; the temperature should not rise above 40° during this addition. The resulting mixture is stirred at 30–40° until a sample dissolves completely in sodium carbonate solution. The mixture is poured into ice/water, 10 g of sodium chloride are added per 100 ml of suspension and the precipitate is filtered off. The precipitate is washed with a 10% sodium chloride solution until neutral and dried. The 1-amino-2-bromo-4-mesidino-6/7-chloroanthraquinone-3'-sulfonic acid thus obtained is introduced into a molten mixture of 200 parts of p-tertiary butylphenol and 60 parts of a 50% potassium hydroxide solution. Whilst distilling off water, the temperature is raised to 200°. The condensation reaction is allowed to proceed for 15 hours at 200°. After the reaction has ended, the dye of the formula

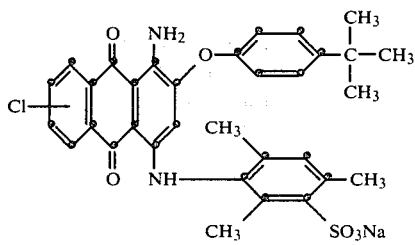

is separated out by precipitation with a 10% sodium hydroxide solution and worked up, as in Example 1. The dye is obtained in the form of a violet powder which dissolves in water to give a violet coloured solution; on polyamide fibres it displays the same coloristic properties as the dye of Example 1.

EXAMPLE 3

80 parts of a 50% potassium hydroxide solution are introduced into 200 parts of molten p-tert.-butylphenol and the temperature of the melt is forced up to 180°, water being distilled off. 54.4 parts of the condensation product of 1-amino-4-bromo-6/7-chloro-anthraquinone-2-sulfonic acid and 2,6-diaminomesitylene-4-sulfonic acid (obtained by the procedure described in Example 1) are now added and the resulting mixture is stirred for a further 4 hours at 220°. The temperature is allowed to fall to 100°, the mixture is diluted with 1,000 parts of water and the dye base which has precipitated is filtered off. The p-tert.-butylphenol which is still present is distilled off with steam—as in Example 1.

6 parts of this base are dissolved in 60 parts of water at pH 7. 1 part of acetyl chloride is now added dropwise in the course of 10 minutes at 15–20°, the pH value of the reaction mixture being kept at 6.5–7.5 by adding a 5% sodium hydroxide solution. The mixture is stirred for a further 3 hours at 15–20°. The acylated dye of the formula

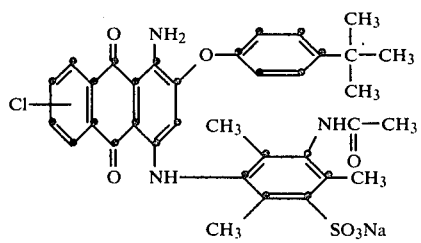

is precipitated by adding 10 g of sodium chloride per 100 ml of solution. A water-soluble, bluish-tinged violet powder is obtained which displays a very good affinity for polyamide.

If, in the above example, the 200 parts of p-tert.-butylphenol are replaced by 200 parts of p-tert.-amylphenol or by 200 parts of isooctylphenol, similar dyes with equally good coloristic properties are obtained.

EXAMPLE 4

6 parts of the dye according to Example 1 are dissolved in portions, with 1.5 parts of N-methylolchloroacetamide, in 25 parts of 95% sulfuric acid at 0–5°. The solution is stirred for a further 15 hours at 0–5°, the reaction mixture is poured into ice/water and the dye which is precipitated is filtered off with suction. The material on the suction filter is suspended in water and the pH of the suspension is adjusted to 7 with sodium hydroxide solution. The sodium salt of the dye of the formula

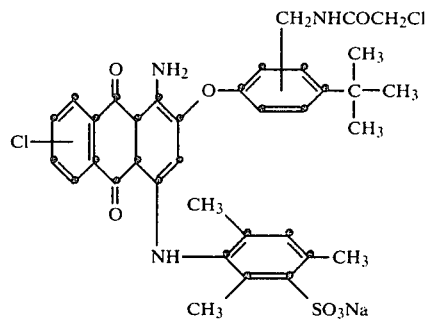

is precipitated by adding 5 g of sodium chloride per 100 ml of solution. This dye dyes polyamide fibres in violet shades with a very good uptake and good wet fastness properties.

EXAMPLE 5

54 parts of the anthraquinone base of the formula

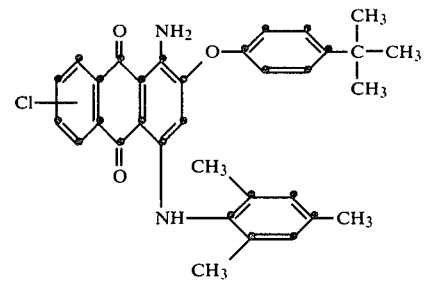

obtained by means of a phenol melt from 1-amino-4-mesidino-6/7-chloro-anthraquinone-2-sulfonic acid and p-tert.-butylphenol, are dissolved in 500 parts of sulfuric acid monohydrate at 0° to 5°. 95 parts of 25% oleum are allowed to run in at 0° to 5° and the sulfonation mixture is poured into an ice/water mixture. The monosulfonic acid of the formula

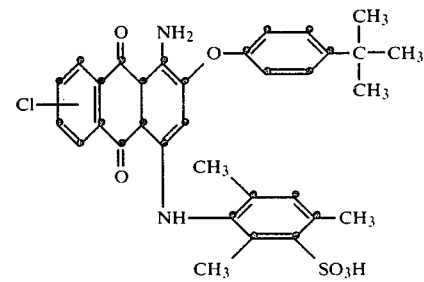

which has precipitated, is filtered off with suction and suspended in water, the pH of the suspension is adjusted to 7 with NaOH, and 2 g of sodium chloride per 100 ml of solution are added to the neutral solution. The sodium salt of the dye, which has precipitated, is filtered off with suction and washed with a 2% sodium chloride solution.

The dye displays an excellent build-up on synthetic polyamide fibres, which it dyes in clear violet colour shades which are fast to light and fast to wet processing.

A dye with similar properties is obtained when the 54 parts of 1-amino-2-p.-tert.-butyl-phenoxy-4-mesidino-6/7-chloro-anthraquinone are replaced by 60 parts of 1-amino-2-p-isooctylphenoxy-4-mesidino-6/7-chloroanthraquinone and in other respects the above precedure is repeated.

EXAMPLE 6

5 parts of 1-amino-2-p-tert.-butylphenoxy-4-mesidino-6/7-chloro-anthraquinone are dissolved in 150 parts of carbon tetrachloride, and 2 parts of chlorosulfonic acid are added. The reaction mixture is stirred at 70° for 24 hours and the dye of the formula

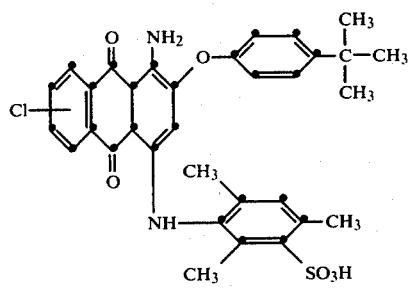

which has precipitated, is filtered off with suction and washed with carbon tetrachloride. On polyamide fibres, the sodium salt of the dye displays the same coloristic properties as the dye of Example 5.

EXAMPLE 7

80 parts of a 50% potassium hydroxide solution are introduced into 200 parts of molten p-tert.-butyl-phenol and the temperature of the melt is raised to 180°, whilst distilling off water. 54.4 parts of the condensation product of 1-amino-4-bromo-6/7-chloro-anthraquinone-2-sulfonic acid and 2,6-diaminomesitylene-4-sulfonic acid are now added and the resulting mixture is stirred for a further 4 hours at 220°. The temperature is allowed to fall to 100°, the reaction mixture is diluted with 1,000 parts of water, the reaction product is filtered off and the p-tert.-butylphenol still present is then distilled off with steam. 37 parts of the product obtained and dried are dissolved in 150 parts of oleum with a 10% $SO_3$ content and the solution is stirred at 25° to 30° until thin layer chromatography shows no further starting material. The sulfonation mixture is poured into an ice/brine mixture and the sulfonation product which has precipitated is filtered off with suction. The disulfonic acid thus obtained is suspended in water, the pH of the suspension is adjusted to 7 with NaOH and 25 g of sodium chloride per 100 ml of solution are added. The product of the formula

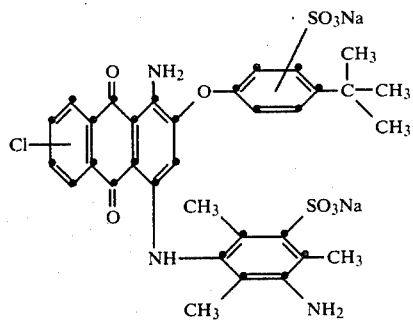

which has precipitated, is filtered off with suction and dried.

6 parts of this product are dissolved in 60 parts of water at pH 7. 2.6 parts of α,β-dibromopropionyl chloride, dissolved in 2 parts by volume of acetone, are added dropwise in the course of 30 minutes at 15° to 20°. The pH value of the reaction mixture is kept at 6.5 to 7 by adding a 10% sodium bicarbonate solution. The reaction mixture is stirred for a further 2 hours at 15° to 20°, during which time some of the dye precipitates. The precipitation of the acylated dye is brought to completion by adding 7 g of sodium chloride per 100 ml of solution. The novel fibre-reactive anthraquinone dye which has formed and has the formula

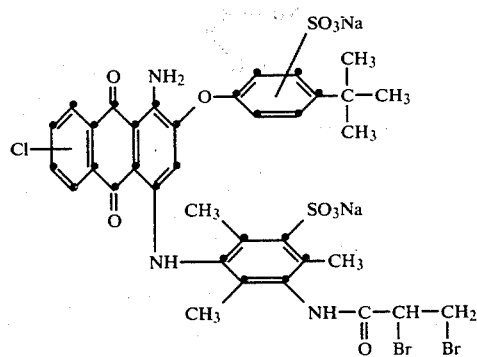

is filtered off with suction, washed with 10% aqueous sodium chloride solution and dried in vacuo at 40° to 50°.

A water-soluble violet dye is obtained which dyes wool, preferably in the presence of levelling agents (for example a condensation product of higher aliphatic amines with ethylene oxide), from a bath containing acetic acid, in brilliant violet shades which are fast to wet processing and have good fastness to light.

When the procedure of this example is repeated, except that 1.7 parts of α-bromoacryloyl chloride are used in place of the 2.6 parts of α,β-dibromopropionyl chloride, a similar reactive dye with equally good coloristic properties is obtained.

When the procedure of the above example is repeated, except that the 2,6-diamino-mesitylene-4-sulfonic acid is replaced by an equivalent amount of 1,4-diamino-2,3,5,6-tetramethylbenzene, the dye of the formula

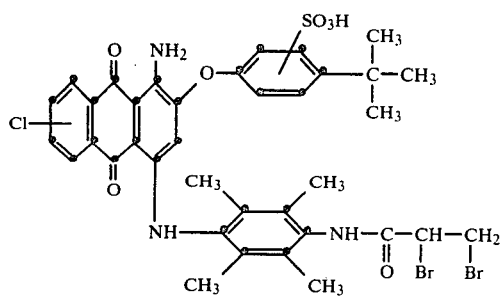

is obtained, which displays excellent wet fastness properties on wool.

EXAMPLE 8

54 parts of 1-amino-2-p.-tert.-butylphenoxy-4-mesidino-6/7-chloro-anthraquinone of the formula

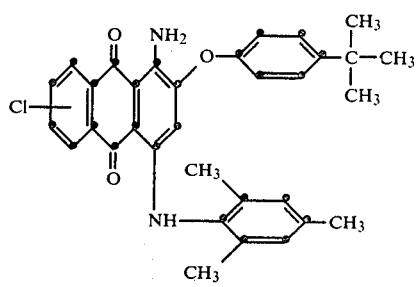

are dissolved in 500 parts of oleum with a 10% $SO_3$ content and the solution is stirred at 25° until thin layer chromatography shows no further starting material. The disulfonic acid of the formula

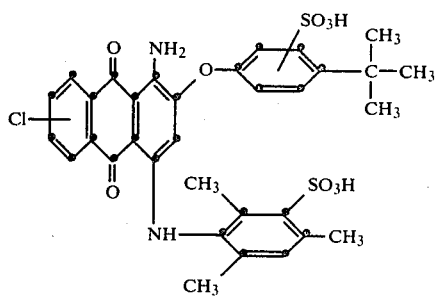

is obtained. The sulfonation mixture is then diluted with 130 parts of water, the concentration of the $H_2SO_4$ being lowered to about 80%. The temperature rises to 90°. The mixture is warmed and stirred for a further 1 hour at 110°. The reaction mixture is then poured into a mixture of ice and water. The monosulfonic acid which has precipitated is filtered off with suction and suspended in 500 parts of water and the pH of the suspension is adjusted to 7 with NaOH. The sodium salt of the novel dye of the formula

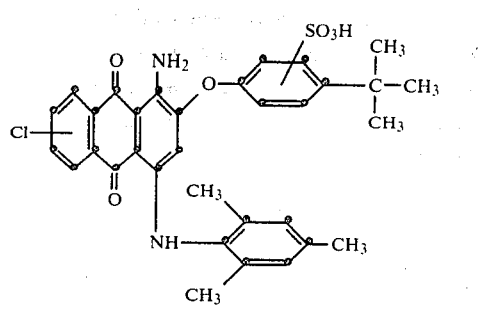

is precipitated by adding 2 g of sodium chloride per 100 ml of solution. From a weakly acid bath, it dyes polyamide fibres in violet shades with a very good uptake and the dyeings have outstanding wet fastness properties.

A dye with similar properties is obtained when the 54 parts of 1-amino-2-p-tert.-butylphenoxy-6/7-chloro-anthraquinone are replaced by 60 parts of 1-amino-2-p-isooctylphenoxy-4-mesidino-6/7-chloroanthraquinone and in other respects the indicated procedure is repeated.

EXAMPLE 9

54 parts of 1-amino-2-p-tert.-butylphenoxy-4-mesidino-6/7-chloro-anthraquinone are dissolved in 500 parts of oleum with a 10% $SO_3$ content and the solution is stirred at 25° for 4 hours. The sulfonation mixture is poured into an ice/water mixture and the reaction product which has precipitated is filtered off with suction. The disulfonic acid thus obtained is suspended in water, the pH of the suspension is adjusted to 7 with NaOH, and 25 g of sodium chloride per 100 ml of solution are added. The sodium salt of the dye of the formula

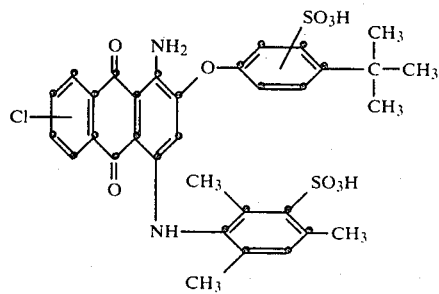

is obtained and this is filtered off with suction and dried.

50 parts of this dye are suspended in 200 parts of sulfolane at 210° for 1 hour. The reaction mixture is diluted with 500 parts of water, and 20 parts of concentrated hydrochloric acid are added at 40°. The monosulfonic acid of the formula

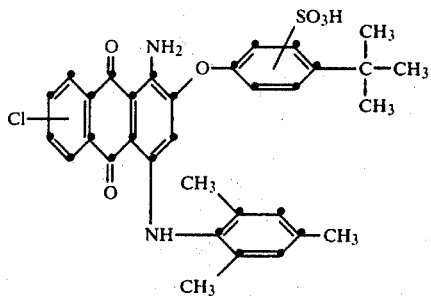

which has precipitated, is filtered off with suction and worked up as in Example 1. On polyamide fibres, the novel dye displays the same coloristic properties as the dye of Example 8.

The violet dye which has the above formula except that it contains Br in place of Cl and which has similar properties is obtained when the above procedure is repeated but 54 parts of 1-amino-2-p.-tert.-butylphenoxy-4-mesidino-6/7-bromo-anthraquinone are employed as the starting compound.

EXAMPLE 10

80 g of the sodium salt of the disulfonic acid of the formula

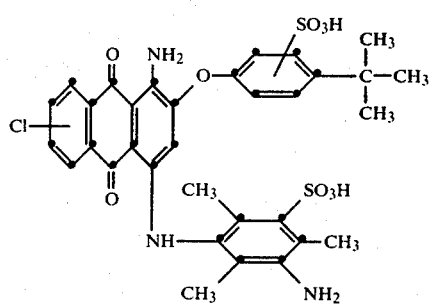

are suspended in 300 parts of sulfolane at 210° for 1 hour. The reaction mixture is diluted with 750 parts of water, and 30 parts of concentrated hydrochloric acid are added at 40°. The monosulfonic acid of the formula

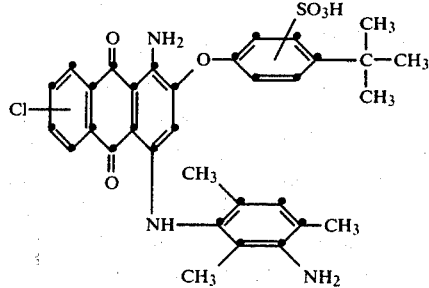

which has precipitated, is filtered off with suction and dried.

6 parts of this anthraquinone base are dissolved in 60 parts of water at pH 7. 1 part of acetyl chloride is now added dropwise in the course of 10 minutes at 15° to 20°, the pH value of the reaction mixture being kept at 6.5 to 7.5 by adding a 5% sodium hydroxide solution. The reaction mixture is stirred for a further 3 hours at 15° to 20°. The acylated dye of the formula

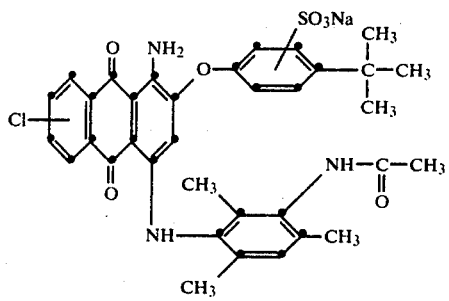

is precipitated by adding 10 g of sodium chloride per 100 ml of solution. A water-soluble, bluish-tinged violet powder is obtained which displays a very good uptake on polyamide.

If, in the above example, 1 part of acetyl chloride is replaced by 2 parts of dibromopropionyl chloride, the dye of the formula

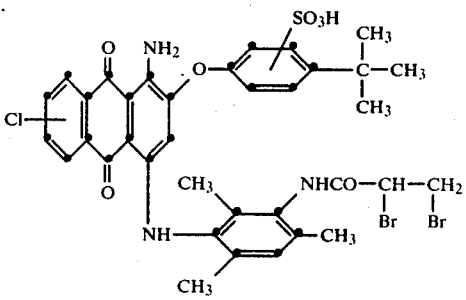

is obtained, which displays excellent wet fastness properties on wool.

EXAMPLE 11

6 parts of the dye according to Example 9 are dissolved in portions, with 1.5 parts of N-methylolchloroacetamide, in 25 parts of 95% sulfuric acid at 0–5°. The solution is stirred for a further 15 hours at 0–5°, the reaction mixture is poured into ice/water and the dye which has precipitated is filtered off with suction. The material on the suction filter is suspended in water and the pH of the suspension is adjusted to 7 with sodium hydroxide solution. The sodium salt of the dye of the formula

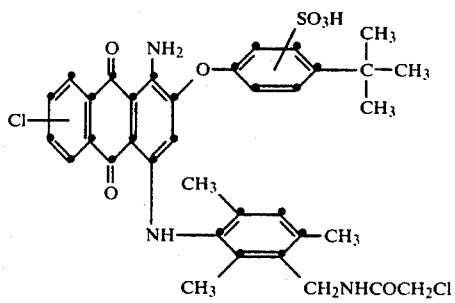

is precipitated by adding 5 g of sodium chloride per 100 ml of solution. This dye dyes polyamide fibres in violet shades with a very good uptake and good wet fastness properties.

EXAMPLE 12

A dyebath is prepared from 4,000 parts of water, 4 parts of ammonium acetate, 2 parts of the dye according to Example 1 and acetic acid in an amount such that the pH value of the bath is 6.0. 100 parts of a synthetic polyamide tricot are put into the resulting dyebath, the bath is heated to the boil in the course of half an hour and dyeing is carried out for 45 minutes at 100°. A violet dyeing with good uptake of the dye is obtained.

What is claimed is:

1. A novel water-soluble anthraquinone dye, or a mixture of such dyes, which, in the form of the free acid, has or have the formula I

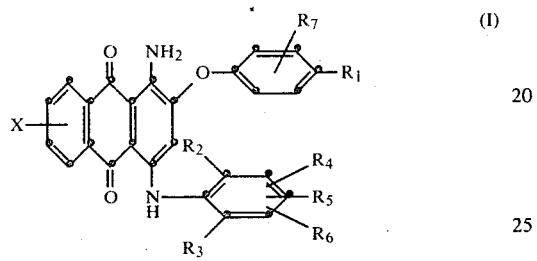

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_6$ and $R_7$ independently of one another are hydrogen, an unbranched or branched alkyl radical having 1–4 carbon atoms, a —$SO_3H$ group, halogen or a radical of the formula —$CH_2$—NH—CO—Y, in which Y is an alkyl or alkenyl radical having 1 to 4 carbon atoms which is unsubstituted or substituted by one or two halogen atoms, or is a substituted or unsubstituted phenyl radical, with the proviso that at least one of the radicals $R_6$ or $R_7$ is a —$SO_3H$ group.

2. An anthraquinone compound according to claim 1, wherein $R_1$ is a branched alkyl radical having 4 to 8 carbon atoms, in particular the tert.-butyl radical.

3. An anthraquinone compound according to claim 1, wherein $R_2$ and $R_3$ are each a methyl radical.

4. An anthraquinone compound according to claim 1, wherein X is a chlorine atom.

5. An anthraquinone compound according to claim 1, wherein one of the groups $R_6$ and $R_7$ is hydrogen and the other is a —$SO_3H$ radical.

6. An anthraquinone compound according to claim 1, wherein $R_5$ is a methyl group in the p-position relative to the amino group.

7. An anthraquinone compound according to claim 1, wherein $R_1$ is a tert.-butyl radical, $R_2$, $R_3$ and $R_5$ are each a methyl group, $R_5$ being in the p-position relative to the amino group, X is a chlorine atom and one of the groups $R_6$ and $R_7$ is hydrogen and the other is a —$SO_3H$ radical.

8. An anthraquinone compound according to claim 1, of the formula

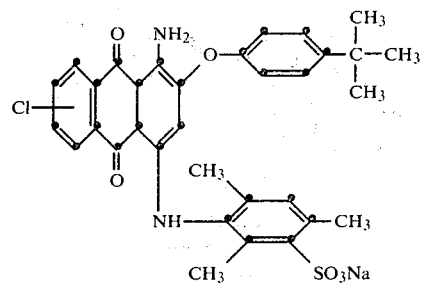

9. An anthraquinone compound according to claim 1, of the formula

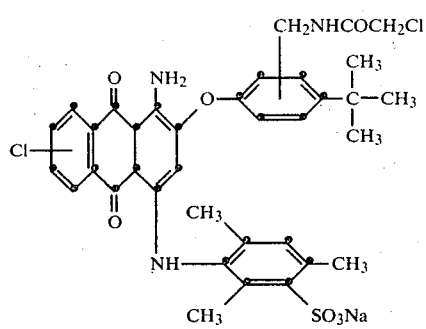

10. A process for the preparation of a novel, water-soluble anthraquinone dye which, in the form of the free acid, has the formula II

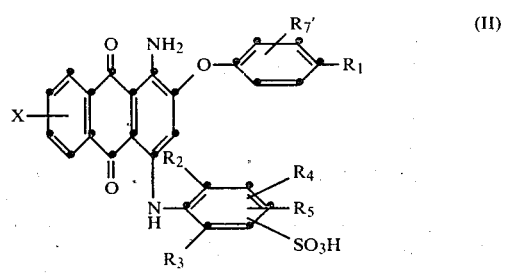

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_7'$ is hydrogen, an unbranched or branched alkyl radical having 1 to 4 carbon atoms, halogen or a radical of the formula —$CH_2$—NH—CO—Y, in which Y is an alkyl or alkenyl radical having 1–4 carbon atoms, which is unsubstituted or substituted by one or two halogen atoms, or is a substituted or unsubstituted phenyl radical, which comprises selectively monosulfonating an anthraquinone compound of the formula V

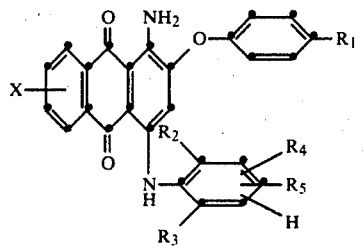

in which X, $R_1$, $R_2$, $R_3$, $R_4$ and $R_5$ are as defined above, and, if desired, subsequently halogenating the reaction product in the phenol ring or reacting it with a compound of the formula $HOCH_2-NH-CO-Y$, in which Y is as defined above.

11. A process according to claim 10, wherein the selective monosulfonation of the anthraquinone compound of the formula V is carried out with oleum containing 1 to 65 percent by weight of free sulfur trioxide, at a temperature of 0° to 5° C. and preferably 0°-2°C., the concentration of free $SO_3$ in the reaction mixture being 4-6%.

12. A process according to claim 11, wherein the selective monosulfonation of the anthraquinone compound of the formula V is carried out with oleum containing 20 to 30 and in particular 25 percent by weight of free sulfur trioxide.

13. A process according to claim 10, wherein the selective monosulfonation of the anthraquinone compound of the formula V is carried out with an equivalent amount of chlorosulfonic acid in a halogenated hydrocarbon, preferably carbon tetrachloride, at a temperature of 50 to 80° C.

14. A modification of the process, for the preparation of an anthraquinone dye of the formula II, according to claim 10, which comprises reacting an anthraquinone compound of the formula VI

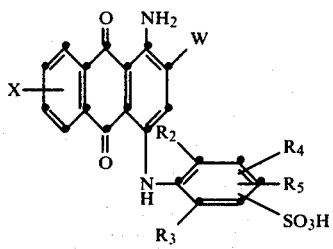

in which X, $R_2$, $R_3$, $R_4$ and $R_5$ are as defined above and W is halogen or a $-SO_3H$ group, with a p-alkylphenol of the formula VII

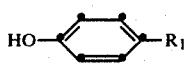

in which $R_1$ is as defined above, in the presence of acid-binding agents and at elevated temperature.

15. A process according to claim 14, wherein the reaction of the anthraquinone compound of the formula VI with the phenol of the formula VII is carried out at a temperature of 180° to 240° C. and in particular 220° C.

16. A process for the preparation of a novel, water-soluble anthraquinone dye which, in the form of the free acid, has the formula III

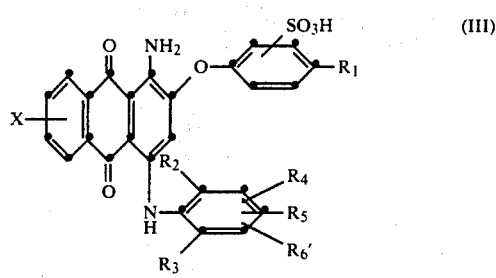

in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and $R_6'$ is hydrogen, an unbranched or branched alkyl radical having 1 to 4 carbon atoms, halogen or a radical of the formula $-CH_2-NH-CO-Y$, in which Y is an alkyl or alkenyl radical having 1-4 carbon atoms, which is unsubstituted or substituted by one or two halogen atoms, or is a substituted or unsubstituted phenyl radical, which comprises effecting selective desulfonation in the aniline ring of an anthraquinone compound of the formula IV

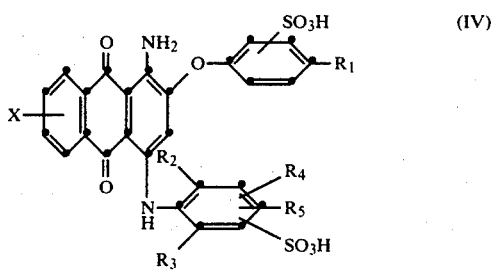

in which X, $R_1$, $R_2$, $R_3$, $R_4$ and $R_5$ are as defined above, and, if desired, subsequently replacing a hydrogen atom in the aniline ring of the resulting product by halogen or a group of the formula $-CH_2-NH-CO-Y$, in which Y is as defined above.

17. A process according to claim 16, wherein the selective desulfonation of the anthraquinone compound of the formula IV is carried out with 60 to 90% aqueous sulfuric acid at a temperature of 80° to 120° C. and in particular with 80% aqueous sulfuric acid at a temperature of 110° C.

18. A process according to claim 16, wherein the selective desulfonation of the anthraquinone compound of the formula IV is carried out with sulfolane at a temperature of 180° to 220° C. and in particular 210° C.

19. A process for the preparation of a novel, water-soluble anthraquinone dye which, in the form of the free acid, has the formula IV

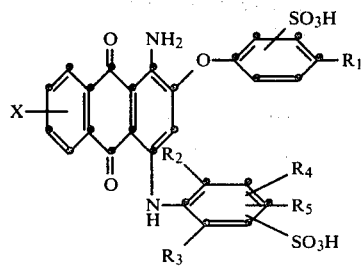

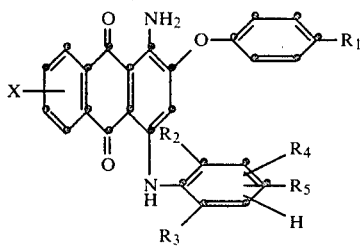

in which X is halogen, $R_1$ is an unbranched or branched alkyl radical having 4 to 8 carbon atoms, $R_2$ and $R_3$ independently of one another are an unbranched or branched alkyl radical having 1 to 4 to carbon atoms, $R_4$ is hydrogen, an unbranched or branched alkyl radical having 1 to 4 carbon atoms, a free or acylated amino group or a fibre-reactive radical bonded via an amino group and $R_5$ is hydrogen or an unbranched or branched alkyl radical having 1 to 4 carbon atoms, which comprises sulfonating an anthraquinone compound of the formula V

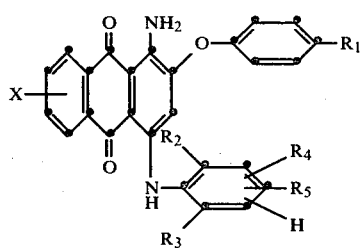

in which X, $R_1$, $R_2$, $R_3$, $R_4$ and $R_5$ are as defined above, so that two sulfonic acid groups are introduced.

20. A process according to claim 19, wherein the sulfonation is carried out at a temperature of 10° to 40°, and preferably about 20°, with oleum containing 1 to 20 and preferably 5–10% of free sulfur trioxide.

21. An intermediate of the formula VI

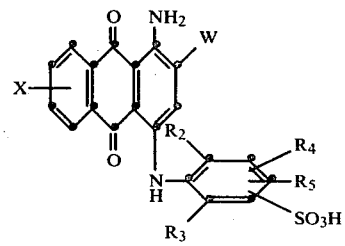

in which X is halogen, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group, $R_5$ is hydrogen or an unbranched or branched alkyl radical having 1 to 4 carbon atoms and W is halogen or a —$SO_3H$ group.

22. An intermediate of the formula V in which X is halogen, $R_1$ is an unbranched or branched alkyl radical having 4 to 8 carbon atoms, $R_2$ and $R_3$ independently of one another are an unbranched or branched alkyl radical having 1 to 4 carbon atoms, $R_4$ is hydrogen, an unbranched or branched alkyl radical having 1 to 4 carbon atoms, a free or acylated amino group or a fibre-reactive radical bonded via an amino group and $R_5$ is hydrogen or an unbranched or branched alkyl radical having 1 to 4 carbon atoms.

23. A process for the preparation of an intermediate of the formula V

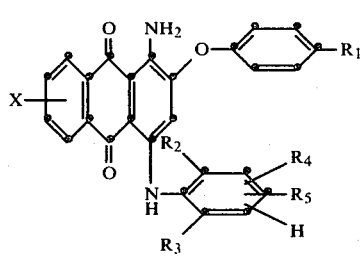

in which X, $R_1$, $R_2$, $R_3$, $R_4$ and $R_5$ are defined in claim 20, which comprises reacting a compound of the formula VIII

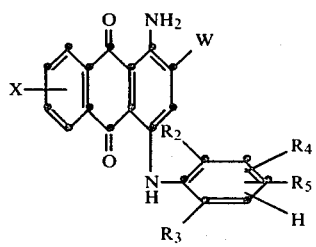

in which X, $R_2$, $R_3$, $R_4$ and $R_5$ are as defined above and W is halogen or a —$SO_3H$ group, with a p-alkylphenol of the formula VII

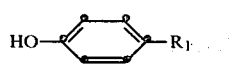

in which $R_1$ is as defined above, in the presence of acid-binding agents, at elevated temperature, preferably at 180°–240° C. and in particular at 220° C.

24. An intermediate of the formula IX

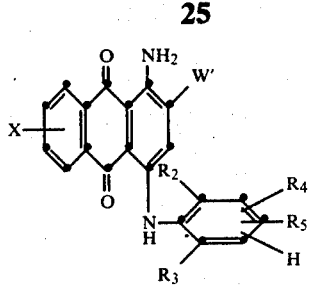

(IX)

in which X, $R_2$, $R_3$, $R_4$ and $R_5$ are as defined above and $W'$ is halogen.

25. Method to use a water-soluble anthraquinone dye according to claim 1 or of an anthraquinone dye obtained according to the process of any one of the of claims 10 to 20 for dyeing or printing textile material of natural and synthetic polyamide materials.

26. The textile material of natural or synthetic polyamide material, dyed or printed with an anthraquinone dye according to claim 1.

* * * * *